United States Patent
Chang et al.

(10) Patent No.: US 8,710,150 B2
(45) Date of Patent: Apr. 29, 2014

(54) BLENDED BLOCK COPOLYMER COMPOSITION

(75) Inventors: Shih-Wei Chang, Natick, MA (US);
Valeriy V. Ginzburg, Midland, MI (US);
Erin B. Vogel, Midland, MI (US);
Daniel J. Murray, Midland, MI (US);
Peter Trefonas, Medway, MA (US);
Phillip D. Hustad, Manvel, TX (US)

(73) Assignee: Rohm and Haas Electronic Materials LLC, Marlborough, MA (US)

( * ) Notice: Subject to any disclaimer, the term of this patent is extended or adjusted under 35 U.S.C. 154(b) by 280 days.

(21) Appl. No.: 13/370,606

(22) Filed: Feb. 10, 2012

(65) Prior Publication Data

US 2013/0209694 A1    Aug. 15, 2013

(51) Int. Cl.
*C08L 53/00*    (2006.01)
*B05D 3/02*    (2006.01)

(52) U.S. Cl.
CPC . *C08L 53/00* (2013.01); *B05D 3/02* (2013.01); *C08L 2205/025* (2013.01)
USPC ........... 525/209; 525/288; 525/299; 526/279; 216/51

(58) Field of Classification Search
CPC ...... C08L 53/00; C08L 2205/025; B05D 3/02
USPC ........... 525/288, 299, 209; 526/279; 524/505; 427/387; 216/51
See application file for complete search history.

(56) References Cited

U.S. PATENT DOCUMENTS

| | | |
|---|---|---|
| 7,560,141 B1 | 7/2009 | Kim et al. |
| 2005/0113475 A1 | 5/2005 | Nishida et al. |
| 2007/0254169 A1 | 11/2007 | Kamins et al. |
| 2010/0075116 A1 | 3/2010 | Russell et al. |
| 2011/0059299 A1 | 3/2011 | Kim et al. |

OTHER PUBLICATIONS

Maessen et al., Microelectronic Eng., 78-79, pp. 540-545 (2005).*
Bruce et al., J. Vac. Sci. Technol. B, 28(4), pp. 751-757, Jul./Aug. 2010.*
Long, B.K., PhD Thesis, University of Texas (2009).*
Takenaka, et al, Formation of long-range stripe patterns with sub-10-nm half-pitch from directed self-assembly of block copolymer, Journal of Polymer Science: Part B, Polymer Physics, vol. 48, pp. 2297-2301 (2010).
Stadermann, et al., Functionalized Block Copolymers for Preparation of Reactive Self-Assembled Surface Patterns, Journal of Polymer Science Part A: Polymer Chemistry, published online (2011).

* cited by examiner

*Primary Examiner* — Susannah Chung
*Assistant Examiner* — Josephine Chang
(74) *Attorney, Agent, or Firm* — Thomas S. Deibert

(57) ABSTRACT

A block copolymer composition containing a diblock copolymer blend including a first poly(methyl methacrylate)-b-poly((trimethylsilyl)methyl methacrylate) diblock copolymer; and, a second poly(methyl methacrylate)-b-poly((trimethylsilyl)methyl methacrylate) diblock copolymer. Also provided are substrates treated with the block copolymer composition.

10 Claims, 1 Drawing Sheet

BLENDED BLOCK COPOLYMER COMPOSITION

The present invention relates to the field of self assembling block copolymers. In particular, the present invention is directed to a block copolymer composition containing a diblock copolymer blend including a first poly(methyl methacrylate)-b-poly((trimethylsilyl)methyl methacrylate) diblock copolymer; and, a second poly(methyl methacrylate)-b-poly((trimethylsilyl)methyl methacrylate) diblock copolymer.

Some block copolymers, consisting of two or more distinct homopolymers joined end to end, are known self-assemble into periodic micro domains having typical dimensions of 10 nanometers to 50 nanometers (nm). The possibility of using such micro domains to pattern surfaces has attracted increasing interest because of the expense and difficulty of patterning in nanoscale dimensions (especially sub-45 nm) using optical lithography.

Controlling the lateral placement of the block copolymer micro domains on the substrates continues to be a challenge, however. This problem has been previously addressed using lithographically pre-defined topographic and/or chemical patterning of the substrate. Previous studies have demonstrated that self-assembled block copolymer micro domains in form of lamellae can be directed to follow chemical patterning of the substrate, yielding periodicities close to those of the chemical pre-patterns. Other studies have shown that by controlling the surface wetting properties of the block copolymer on the bottom and side walls of a topographic pre-pattern, the lamellae can be directed to follow the topographic pre-pattern. The lamellae formed line/space patterns of smaller dimensions than the substrate pre-pattern, subdividing the topographic pre-pattern into a higher frequency line pattern; that is, a line pattern having a smaller pitch. One limitation of block copolymer patterning is the propensity of the patterns to form everywhere on the pre-pattern surface, for topographic and/or chemical guiding pre-patterns.

The ability to shrink the size of various features on a given substrate (e.g., gates in field effect transistors) is currently limited by the wavelength of light used to expose photoresists (i.e., 193 nm). These limitations create a significant challenge for the fabrication of features having a critical dimension (CD) of <50 nm. The use of conventional block copolymers present difficulties in orientation control and long range ordering during the self assembly process. Moreover, such block copolymers frequently provide inadequate etch resistance for subsequent processing steps.

Takenaka, et al.[1] investigated the use of diblock copolymer for directed self assembly. Specifically, Takenaka, et al. demonstrated the directed self assembly down to sub-10-nm half pitch using a poly(styrene)-b-poly(dimethyl siloxane) diblock copolymer with a molecular weight of 15.8 kg/mol; a heterogeneity index of 1.03; and, a poly(styrene) volume fraction of 0.74 poly(styrene); wherein the diblock copolymer film was annealed in vacuum at 170° C. for 24 hours.

Takenaka, et al, *Formation of long-range stripe patterns with sub-10-nm half-pitch from directed self-assembly of block copolymer*, JOURNAL OF POLYMER SCIENCE: PART B, Polymer Physics, vol. 48, pp. 2297-2301 (2010).

Notwithstanding, there remains a need for new copolymer compositions for use in patterning substrates. In particular, there remains a need for new copolymer compositions that enable patterning on intermediate length scales (e.g., 20 to 40 nm) and that preferably exhibit a fast annealing profile with low defect formation.

The present invention provides a block copolymer composition, comprising: a diblock copolymer blend, comprising: a first poly(methyl methacrylate)-b-poly((trimethylsilyl)methyl methacrylate) diblock copolymer ("DB1") having a DB1 number average molecular weight, $M_{N-DB1}$, of 10 to 1,000 kg/mol; a DB1 polydispersity, $PD_{DB1}$, of 1 to 3; and, a second poly(methyl methacrylate)-b-poly((trimethylsilyl)methyl methacrylate) diblock copolymer ("DB2") having a DB2 number average molecular weight, $M_{N-DB2}$, of 1 to 1,000 kg/mol; a DB2 polydispersity, $PD_{DB2}$, of 1 to 3.

The present invention provides a block copolymer composition, comprising: a diblock copolymer blend, comprising: a first poly(methyl methacrylate)-b-poly((trimethylsilyl)methyl methacrylate) diblock copolymer ("DB1") having a DB1 number average molecular weight, $M_{N-DB1}$, of 10 to 1,000 kg/mol; a DB1 polydispersity, $PD_{DB1}$, of 1 to 3; and, a second poly(methyl methacrylate)-b-poly((trimethylsilyl)methyl methacrylate) diblock copolymer ("DB2") having a DB2 number average molecular weight, $M_{N-DB2}$, of 1 to 1,000 kg/mol; a DB2 polydispersity, $PD_{DB2}$, of 1 to 3; wherein the diblock copolymer blend exhibits a blend poly(methyl methacrylate) weight fraction, $Wf_{PMMA-Blend}$, in a range selected from the group of ranges consisting of 0.69 to 0.83; 0.39 to <0.69; and 0.23 to <0.39; and, wherein the diblock copolymer blend exhibits a blend number average molecular weight, $M_{N-Blend}$, of 10 to 1,000 kg/mol.

The present invention provides a block copolymer composition, comprising: a diblock copolymer blend, comprising: a first poly(methyl methacrylate)-b-poly((trimethylsilyl)methyl methacrylate) diblock copolymer ("DB1") having a DB1 poly(methyl methacrylate) mass fraction, $Wf_{PMMA-DB1}$, of 0.69 to 0.83; a DB1 number average molecular weight, $M_{N-DB1}$, of 10 to 1,000 kg/mol; a DB1 polydispersity, $PD_{DB1}$, of 1 to 3; and, a second poly(methyl methacrylate)-b-poly((trimethylsilyl)methyl methacrylate) diblock copolymer ("DB2") having a DB2 having a DB2 poly(methyl methacrylate) mass fraction, $Wf_{PMMA-DB2}$, of 0.69 to 0.83; a DB2 number average molecular weight, $M_{N-DB2}$, of 1 to 1,000 kg/mol; a DB2 polydispersity, $PD_{DB2}$, of 1 to 3.

The present invention provides a method comprising: providing a substrate; providing a block copolymer composition of the present invention; applying a film of the block copolymer composition to the substrate; optionally, baking the film; annealing the film; treating the annealed film to remove the poly(methyl methacrylate) from the annealed film and to convert the (trimethylsilyl)methyl methacrylate in the annealed film to $SiO_x$.

DETAILED DESCRIPTION

Figure 1:
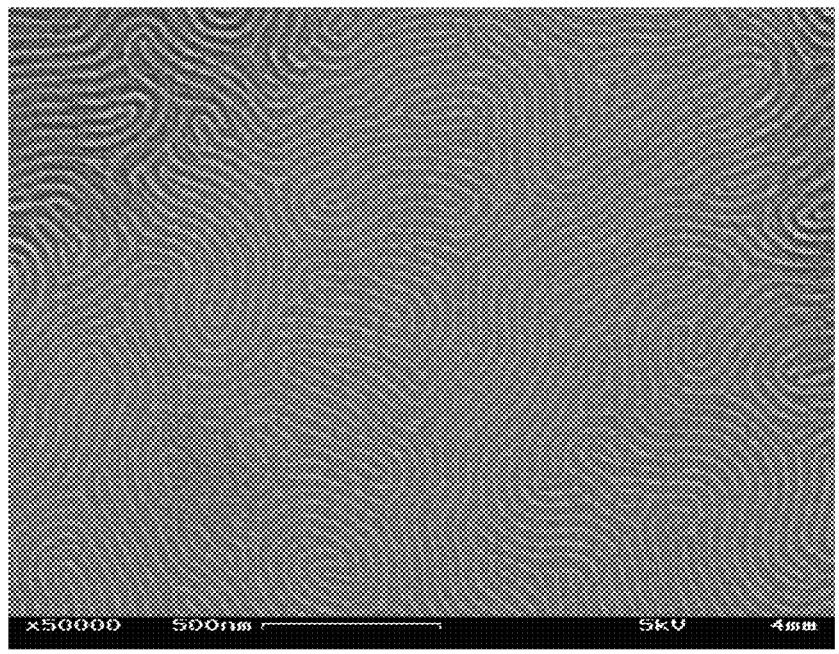
FIG. 1 is a depiction of a top down scanning electron microscopic ("SEM") image of the product film prepared according to Example 8.

When applied to the surface of a substrate, the block copolymer composition of the present invention exhibits an improved capability to anneal at a given processing temperature to a low defect structure compared to that obtained using a conventional silicon containing polymers, such as PS-b-PDMS. Moreover, the incorporation of an inorganic moiety in the poly((trimethylsilyl)methyl methacrylate) domain of the block copolymer composition of the present invention is convertible to an etch resistant species (e.g., a mask) upon processing of the deposited block copolymer composition to remove the organic components. The block copolymer composition of the present invention provides significant value for enabling thermal processing in directed self assembly applications used to form periodic nanostructures, such as line/space patterns on silicon containing substrates, in, for example, the 20-40 nm range.

The terms "(trimethylsilyl)methyl methacrylate" and "TMSMMA" used herein and in the appended claims refers to a monomer having the following molecular structure:

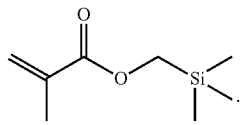

The term "PMMA-b-PTMSMMA block copolymer" used herein and in the appended claims is short hand for a poly (methyl methacrylate)-block-poly((trimethylsilyl)methyl methacrylate) diblock copolymer.

The term "$M_{N\text{-}BCP}$" used herein and in the appended claims in reference to a diblock copolymer used in the block copolymer composition of the present invention is the number average molecular weight of the diblock copolymer determined according to the method used herein in the Examples.

The term "$M_{N\text{-}Blend}$ or blend number average molecular weight" used herein and in the appended claims in reference to a diblock copolymer blend used in the block copolymer composition of the present invention is the weighted average of the number average molecular weights of the diblock copolymers included in the diblock copolymer blend.

The term "$M_{W\text{-}BCP}$" used herein and in the appended claims in reference to a diblock copolymer used in the block copolymer composition of the present invention is the weight average molecular weight of the diblock copolymer determined according to the method used herein in the Examples.

The term "$M_{W\text{-}Blend}$ or blend weight average molecular weight" used herein and in the appended claims in reference to a diblock copolymer blend used in the block copolymer composition of the present invention is the weighted average of the weight average molecular weights of the diblock copolymers included in the diblock copolymer blend.

The term "$PD_{BCP}$," used herein and in the appended claims in reference to a diblock copolymer used in the block copolymer composition of the present invention is the polydispersity of the block copolymer determined according to the following equation:

$$PD_{BCP} = \frac{M_{W\text{-}BCP}}{M_{N\text{-}BCP}}.$$

The term "$Wf_{PMMA}$" used herein and in the appended claims in reference to a diblock copolymer used in the block copolymer composition of the present invention is the weight percent of the poly(methyl methacrylate) block in the block copolymer.

The term "$Wf_{PMMA\text{-}Blend}$ or blend poly(methyl methacrylate) weight fraction" used herein and in the appended claims in reference to a diblock copolymer blend used in the block copolymer composition of the present invention is the weighted average of the weight percent of the poly(methyl methacrylate) block in the block copolymers included in the diblock copolymer blend.

The term "$Wf_{PTMSMMA}$" used herein and in the appended claims in reference to a diblock copolymer used in the block copolymer composition of the present invention is the weight percent of the poly((trimethylsilyl)methyl methacrylate) block in the block copolymer.

The term "$Wf_{PTMSMMA\text{-}Blend}$ or blend poly((trimethylsilyl) methyl methacrylate) weight fraction" used herein and in the appended claims in reference to a diblock copolymer blend used in the block copolymer composition of the present invention is the weighted average of the weight percent of the poly((trimethylsilyl)methyl methacrylate) in the block copolymers included in the diblock copolymer blend.

Block copolymers are polymers that are synthesized from two or more different monomers and exhibit two or more polymeric chain segments that are chemically different, but yet, are covalently bound to one another. Diblock copolymers are a special class of block copolymers derived from two different monomers (e.g., A and B) and having a structure comprising a polymeric block of A residues covalently bound to a polymeric block of B residues (e.g., AAAAA-BBBBB).

The diblock copolymers used in the block copolymer composition of the present invention include diblock copolymers having a poly(methyl methacrylate) block and a poly((trimethylsilyl)methyl methacrylate) block. The diblock copolymers used in the block copolymer composition of the present invention optionally contain one or more other blocks (e.g., a triblock copolymer).

Preferably, the diblock copolymer blend used in the block copolymer composition of the present invention comprises domains of poly(methyl methacrylate) and poly((trimethylsilyl)methyl methacrylate); wherein the block copolymer composition exhibits a film pitch, $L_0$, of 10 to 100 nm (preferably 14 to 60 nm; most preferably 20 to 40 nm) when deposited on a substrate under the conditions set forth herein in the Examples.

Preferably, the diblock copolymer blend used in the block copolymer composition of the present invention comprises: a first poly(methyl methacrylate)-b-poly((trimethylsilyl)methyl methacrylate) diblock copolymer ("DB1") having a DB 1 number average molecular weight, $M_{N\text{-}DB1}$, of 10 to 1,000 kg/mol (preferably 15 to 200 kg/mol; more preferably 15 to 100 kg/mol; most preferably 20 to 60 kg/mol); a DB1 polydispersity, $PD_{DB1}$, of 1 to 3 (preferably 1 to 2; most preferably 1 to 1.2); and, a second poly(methyl methacrylate)-b-poly ((trimethylsilyl)methyl methacrylate) diblock copolymer ("DB2") having a DB2 number average molecular weight, $M_{N\text{-}DB2}$, of 1 to 1,000 kg/mol (preferably 1 to 300 kg/mol; more preferably 1 to 100 kg/mol; most preferably 20 to 60 kg/mol); a DB2 polydispersity, $PD_{DB2}$, of 1 to 3 (preferably 1 to 2; most preferably 1.2). Preferably, the diblock copolymer blend used in the block copolymer composition of the present invention includes a DB1 and a DB2, wherein the weight ratio of DB1 to DB2 in the diblock copolymer blend is 1:1 to 1:9 (preferably 1:1 to 1:5; more preferably 1:1 to 1:2.5). More preferably, the diblock copolymer blend used in the block copolymer composition of the present invention includes a DB1 and a DB2, wherein the diblock copolymer blend is ≥33 wt % to 99 wt % DB1 and 1 to ≤50 wt % DB2 (preferably ≥50 to 99 wt % DB1 and 1 to ≤50 wt % DB2).

Preferably, the diblock copolymer blend used in the block copolymer composition of the present invention exhibits a blend poly(methyl methacrylate) weight fraction, $Wf_{PMMA\text{-}Blend}$, in a range selected from the group of ranges consisting of 0.69 to 0.83 (preferably 0.69 to 0.80; most preferably 0.70 to 0.75); 0.39 to <0.69 (preferably 0.44 to 0.64; most preferably 0.49 to 0.59); and 0.23 to <0.39 (preferably 0.26 to 0.34; most preferably 0.27 to 0.30); and wherein the diblock copolymer blend exhibits a blend number average molecular weight, $M_{N\text{-}Blend}$, of 10 to 1,000 kg/mol (preferably 15 to 200 kg/mol; more preferably 15 to 100 kg/mol; most preferably 20 to 60 kg/mol).

Preferably, the diblock copolymer blend used in the block copolymer composition of the present invention includes a blend of PMMA-b-PTMSMMA diblock copolymers having a blend poly(methyl methacrylate) weight fraction, $Wf_{PMMA\text{-}Blend}$, of 0.69 to 0.83 (preferably 0.69 to 0.80; most preferably 0.70 to 0.75); and a blend number average molecular weight, $M_{N\text{-}Blend}$, of 10 to 1,000 kg/mol (preferably 15 to 200 kg/mol; more preferably 15 to 100 kg/mol; most preferably 20 to 60 kg/mol). Diblock copolymer blends of the present invention having a $Wf_{PMMA\text{-}Blend}$ of 0.69 to 0.83 and an $M_{N\text{-}Blend}$ of 10 to 1,000 kg/mol tend to exhibit cylindrical poly((trimethylsilyl)methyl methacrylate) domains that microphase separate from the poly(methyl methacrylate). Given the teachings provided herein, one of ordinary skill in the art will be able to deposit a block copolymer composition of the present invention containing such a PMMA-b-PTMSMMA diblock copolymer blend, wherein cylindrical poly((trimethylsilyl) methyl methacrylate) domains in the deposited block copolymer composition will self assemble to orient themselves with their axes of symmetry parallel to the surface of the substrate, perpendicular to the surface of the substrate or a combination of parallel and perpendicular to the surface of the substrate, through the selection and control of the film deposition conditions, for example: (a) the substrate's surface energy (i.e., by pretreating the surface of the substrate with an interposing material), (b) the thickness of the film of block copolymer composition deposited, (c) the bake profile of the deposited block copolymer composition (i.e., bake temperature and bake time) and (d) the anneal profile of the deposited block copolymer composition (i.e., anneal temperature and anneal time).

Preferably, the diblock copolymer blend used in the block copolymer composition of the present invention includes a blend of PMMA-b-PTMSMMA diblock copolymers having a blend poly(methyl methacrylate) weight fraction, $Wf_{PMMA\text{-}Blend}$, of 0.39 to <0.69 (preferably 0.44 to 0.64; most preferably 0.49 to 0.59); and a blend number average molecular weight, $M_{N\text{-}Blend}$, of 10 to 1,000 kg/mol (preferably 15 to 200 kg/mol; more preferably 15 to 100 kg/mol; most preferably 20 to 60 kg/mol). Diblock copolymer blends of the present invention having a $Wf_{PMMA\text{-}Blend}$ of 0.39 to <0.69 and an $M_{N\text{-}Blend}$ of 10 to 1,000 kg/mol tend to exhibit microphase separated poly(methyl methacrylate) and poly((trimethylsilyl)methyl methacrylate) lamellar domains. Given the teachings provided herein, one of ordinary skill in the art will be able to deposit a block copolymer composition of the present invention containing such a PMMA-b-PTMSMMA diblock copolymer blend, wherein lamellar domains in the deposited block copolymer composition will self assemble to orient themselves with their axes of symmetry parallel to the surface of the substrate, perpendicular to the surface of the substrate or a combination of parallel and perpendicular to the surface of the substrate, through the selection and control of the film deposition conditions, for example: (a) the substrate's surface energy (i.e., by pretreating the surface of the substrate with an interposing material), (b) the thickness of the film of block copolymer composition deposited, (c) the bake profile of the deposited block copolymer composition (i.e., bake temperature and bake time) and (d) the anneal profile of the deposited block copolymer composition (i.e., anneal temperature and anneal time).

Preferably, the diblock copolymer blend used in the block copolymer composition of the present invention includes a blend of PMMA-b-PTMSMMA diblock copolymers having a blend poly(methyl methacrylate) weight fraction, $Wf_{PMMA\text{-}Blend}$, of 0.23 to <0.39 (preferably 0.26 to 0.34; most preferably 0.27 to 0.30); and a blend number average molecular weight, $M_{N\text{-}Blend}$, of 10 to 1,000 kg/mol (preferably 15 to 200 kg/mol; more preferably 15 to 100 kg/mol; most preferably 20 to 60 kg/mol). Diblock copolymer blends of the present invention having a $Wf_{PMMA\text{-}Blend}$ of 0.23 to <0.39 and an $M_{N\text{-}Blend}$ of 10 to 1,000 kg/mol tend to exhibit cylindrical poly(methyl methacrylate) domains that microphase separate from the poly((trimethylsilyl)methyl methacrylate). Given the teachings provided herein, one of ordinary skill in the art will be able to deposit a block copolymer composition of the present invention containing such a PMMA-b-PTMSMMA diblock copolymer blend, wherein cylindrical poly(methyl methacrylate) domains in the deposited block copolymer composition will self assemble to orient themselves with their axes of symmetry parallel to the surface of the substrate, perpendicular to the surface of the substrate or a combination of parallel and perpendicular to the surface of the substrate, through the selection and control of the film deposition conditions, for example: (a) the substrate's surface energy (i.e., by pretreating the surface of the substrate with an interposing material), (b) the thickness of the film of block copolymer composition deposited, (c) the bake profile of the deposited block copolymer composition (i.e., bake temperature and bake time) and (d) the anneal profile of the deposited block copolymer composition (i.e., anneal temperature and anneal time).

The block copolymer composition of the present invention optionally further comprises a solvent. Solvents include liquids that are able to disperse the diblock copolymers into particles or aggregates having an average hydrodynamic diameter of less than 50 nm as measured by dynamic light scattering. Preferably, the solvent used is selected from propylene glycol monomethyl ether acetate (PGMEA), ethoxyethyl propionate, anisole, ethyl lactate, 2-heptanone, cyclohexanone, amyl acetate, γ-butyrolactone (GBL), n-methylpyrrolidone (NMP) and toluene. More preferably, the solvent used is selected from propylene glycol monomethyl ether acetate (PGMEA) and toluene. Most preferably, the solvent used is toluene.

The block copolymer composition of the present invention optionally further comprises an additive. Additives include additional polymers (including homopolymers and random copolymers); surfactants; antioxidants; photoacid generators; thermal acid generators; quenchers; hardeners; adhesion promoters; dissolution rate modifiers; photocuring agents; photosensitizers; acid amplifiers; plasticizers; orientation control agents; and cross linking agents. Preferred additives for use in the block copolymer composition include homopolymers; surfactants and antioxidants.

Preferably, the block copolymer composition of the present invention further comprises a poly(methyl methacrylate) homopolymer additive ("HPMMA"). More preferably, the block copolymer composition of the present invention comprises a poly(methyl methacrylate) homopolymer; wherein the weight ratio of the poly(methyl methacrylate) homopolymer to the diblock copolymer blend is 1:19 to 3:7 (preferably 1:9 to 3:7; more preferably 1:9 to 1:4). The block copolymer composition of the present invention preferably contains 5 to 30 wt % (more preferably 10 to 30 wt %; most preferably 10 to 20 wt %) (on a solids basis) of a poly(methyl methacrylate) homopolymer. Preferred poly(methyl methacrylate) homopolymer has a number average molecular weight, $M_{N\text{-}PMMA}$, of 1 to 100 kg/mol (more preferably 5 to 50 kg/mol; most preferably 10 to 30 kg/mol). More preferably, the block copolymer composition of the present invention includes a poly(methyl methacrylate) homopolymer; wherein the weight ratio of the poly(methyl methacrylate) homopolymer to the diblock copolymer blend is 1:19 to 3:7 (preferably 1:9 to 3:7; more preferably 1:9 to 1:4); wherein the weight ratio of DB1 to DB2 in the diblock copolymer blend is 1:1 to 1:2.5; wherein the weight fraction of PMMA in DB1, $Wf_{PMMA\text{-}DB1}$, is 0.7 to 0.75; wherein $M_{N\text{-}DB1}$ is 20 to 60 kg/mol; wherein $PD_{DB1}$ is 1 to 1.2; wherein the weight fraction of PMMA in DB2, $Wf_{PMMA\text{-}DB2}$, is 0.7 to 0.75; wherein $M_{N\text{-}DB2}$ is 20 to 60 kg/mol; and, wherein $PD_{DB2}$ is 1 to 1.2.

The method of the present invention preferably comprises: providing a substrate; providing a block copolymer composition of the present invention; applying a film of the block copolymer composition to the substrate; optionally, baking the film; annealing the film; treating the annealed film to remove the poly(methyl methacrylate) from the annealed film and to convert the (trimethylsilyl)methyl methacrylate in the annealed film to $SiO_x$.

Substrates used in the method of the present invention include any substrate having a surface that can be coated with the block copolymer composition of the present invention. Preferred substrates include layered substrates. Preferred substrates include silicon containing substrates (e.g., glass; silicon dioxide; silicon nitride; silicon oxynitride; silicon containing semiconductor substrates such as silicon wafers, silicon wafer fragments, silicon on insulator substrates, silicon on sapphire substrates, epitaxial layers of silicon on a base semiconductor foundation, silicon-germanium substrates); plastic; metals (e.g., copper, ruthenium, gold, platinum, aluminum, titanium and alloys); titanium nitride; and non-silicon containing semiconductive substrates (e.g., non-silicon containing wafer fragments, non-silicon containing wafers, germanium, gallium arsenide and indium phosphide). Most preferred substrates are silicon containing substrates.

Optionally, the surface of the substrate to be coated with the block copolymer composition of the present invention is pretreated with an interposing material before the block copolymer composition of the present invention is applied. Preferably, the pretreatment material acts like a tying layer interposed between the surface of the substrate and the diblock copolymers in the block copolymer composition of the present invention to enhance the adhesion between the diblock copolymers and the substrate. Preferably, the interposing material forms a layer selected from an imaging layer and an orientation control layer.

Imaging layers suitable for use in the method of the present invention include, for example, any type of material that can be patterned or selectively activated. Such materials include, for example, polymer brushes and a self-assembled monolayers of silane and siloxane compounds.

Orientation control layers suitable for use in the method of the present invention include neutral and non-neutral orientation control layers. That is, the orientation control layer can form an interface between the surface of the substrate and the diblock copolymers in the block copolymer composition of the present invention that is preferentially wetted by one of poly(methyl methacrylate) or poly((trimethylsilyl)methyl methacrylate)—i.e., a non-neutral orientation control layer. A neutral orientation control layer refers to a layer that forms an interface between the surface of the substrate and the diblock copolymers in the block copolymer composition of the present invention that is equally wetted by both poly(methyl methacrylate) and poly((trimethylsilyl)methyl methacrylate). Neutral orientation control layers preferably include films prepared by casting a random copolymer that comprises residues of both methyl methacrylate monomers and (trimethylsilyl)methyl methacrylate monomers (e.g., poly(methyl methacrylate)-r-(trimethylsilyl)methyl methacrylate)-OH).

Preferably, the pretreatment of the substrate before depositing the block copolymer composition of the present invention is performed to facilitate the guided self assembly of the diblock copolymers in the block copolymer composition. Specifically, the pretreatment can facilitate one of the two conventional methods used for guided self assembly of block copolymer films, namely graphoepitaxy and chemical epitaxy. In the graphoepitaxy, the surface of the substrate is prepatterned with topographical features on the surface of substrate (e.g., trenches, holes) that operate to direct the self organization of the blocks in the block copolymer.

In the chemical epitaxy, the surface of the substrate is treated with a film that exhibits a compositional pattern, wherein the affinity between the various parts of the compositional pattern is different for poly(methyl methacrylate) and poly((trimethylsilyl)methyl methacrylate). This chemical affinity difference operates to facilitate the directed self assembly of the block copolymer.

Preferably, the interposing layer is formed on the substrate using a method selected from spin coating, dip coating, roll coating, spray coating and laminating (most preferably spin coating). After application of the interposing layer forming material onto the surface of the substrate, the material is optionally further processed to remove any residual solvent. Preferably, the interposing layer is baked at an elevated temperature (e.g., 70 to 340° C.) for at least 10 seconds to 5 minutes to remove any residual solvent from the interposing layer. Preferably, the baked interposing layer is rinsed with a solvent capable of removing any residual unbound interposing layer material from the surface of the substrate and then rebaked at an elevated temperature (e.g., 70 to 340° C.) for at least 10 seconds to 5 minutes to remove any residual solvent.

Applying a film of the block copolymer composition of the present invention to the substrate in the method of the present invention preferably comprises depositing the block copolymer composition onto the substrate using a method selected from spin coating, dip coating, roll coating, spray coating and laminating (most preferably spin coating). After application of the block copolymer composition to the substrate, the deposited block copolymer composition is optionally further processed to remove any residual solvent. Preferably, the deposited block copolymer is baked at an elevated temperature (e.g., 70 to 340° C.) for at least 10 seconds to 5 minutes to remove any residual solvent from the deposited film of the block copolymer composition.

Annealing of the deposited film can be done by any annealing technique, for example, thermal annealing, thermal gradient annealing and solvent vapor annealing. Preferably, the film is annealed using a thermal annealing technique. More preferably, the film is annealed using a thermal annealing technique, wherein the deposited film is heated at a temperature of 200 to 340° C. (more preferably 200 to 300° C.; most preferably 225 to 300° C.) for a period of 0.5 minute to 2 days (more preferably 0.5 minute to 2 hours; still more preferably 0.5 minute to 0.5 hour; most preferably 0.5 minute to 5 minutes). Most preferably, the film is annealed in an oxygen free atmosphere (i.e., $[O_2]<5$ ppm).

In the method of the present invention, the annealed film is treated to remove the poly(methyl methacrylate) in the annealed film and to convert the poly((trimethylsilyl)methyl methacrylate) in the annealed film to $SiO_x$, providing a product film with a plurality of voids (i.e., trench shaped voids perpendicular to the surface of the substrate; cylindrical holes with axes of symmetry perpendicular to the surface of the substrate; a plurality of cylindrical $SiO_x$ posts with axes of symmetry perpendicular to the surface of the substrate). The treatment comprises: exposing the film to conditions that exhibit differential reactivity towards the poly(methyl methacrylate) in the film relative to the poly((trimethylsilyl)methyl methacrylate) in the film, to facilitate removal of the poly(methyl methacrylate) domains from the annealed film and the conversion of the poly((trimethylsilyl)methyl methacrylate) domains to $SiO_x$. Preferably, the treatment comprises: optionally, exposing the annealed film to a halogen containing plasma (e.g., $CF_4$) to remove any wetting layer that formed on the surface of the annealed film; followed by exposing the annealed film to a reactive plasma or a reactive ion etching atmosphere to remove the poly(methyl methacrylate) and to convert the poly((trimethylsilyl)methyl methacrylate) to $SiO_x$. Most preferably, the treatment comprises: exposing the annealed film to a halogen containing plasma to remove any wetting layer formed on the annealed film; and then exposing the annealed film to a reactive plasma or a reactive ion etching atmosphere, wherein the atmosphere comprises a plasma composed of a low pressure ionized oxidizing gas (preferably $O_2$); wherein the poly(methyl methacrylate) in the annealed film is removed and the poly((trimethylsilyl)methyl methacrylate) in the annealed film is converted to $SiO_x$.

Some embodiments of the present invention will now be described in detail in the following Examples.

The following materials were passed through a column packed with activated A-2 grade alumina before being used in the Examples herein, namely tetrahydrofuran (99.9% pure available from Aldrich), styrene (available from Aldrich), and cyclohexane (HPCL grade available from Fischer). The following materials were passed through a column packed with basic alumina before being used in the Examples herein, namely 1,1-diphenylethylene (available from Aldrich) and methyl methacrylate (MMA). All the other materials used in the Examples herein were commercial materials that were used as received.

The film thicknesses reported in the Examples herein were measured using a NanoSpec/AFT 2100 Film Thickness Measurement tool. The thickness of the films were determined from the interference of a white light passed through a diffraction grating. A standard program called "Polyimide on Silicon" was used to analyze the component wavelengths (380-780 nm) to determine the film thickness. The thickness of the film of the deposited block copolymer composition and the brush layer were measured together as one polymeric layer. The reported film thickness is the combined thickness of the deposited block copolymer composition and the brush layer.

The number average molecular weight, $M_N$, and polydispersity values reported in the Examples were measured by gel permeation chromatography (GPC) on an Agilent 1100 series LC system equipped with an Agilent 1100 series refractive index and MiniDAWN light scattering detector (Wyatt Technology Co.). Samples were dissolved in HPCL grade THF at a concentration of approximately 1 mg/mL and filtered through at 0.20 µm syringe filter before injection through the two PLGel 300×7.5 mm Mixed C columns (5 mm, Polymer Laboratories, Inc.). A flow rate of 1 mL/min and temperature of 35° C. were maintained. The columns were calibrated with narrow molecular weight PS standards (EasiCal PS-2, Polymer Laboratories, Inc.).

Proton nuclear magnetic resonance ($^1$H NMR) spectroscopy results referred to in the Examples was done on a Varian NOVA 400 MHz NMR spectrometer. Deuterated chloroform was used. A delay time of 10 seconds was used to ensure complete relaxation of protons for quantitative integrations. Chemical shifts are reported relative to tetramethylsilane.

A PlasmaTherm 790i/reactive ion etch platform was used for all of the reactive ion etching steps mentioned in the Examples.

The film pitch, $L_0$, for the films reported in the Examples was measured using image analysis of the SEMS of the films with ImageJ, a public domain, JAVA based image processing program. Spatial calibration was first carried out to convert distance in pixels in the image to distances in nanometers for a given SEM image. To measure the film pitch, a line was drawn across and perpendicular to multiple $SiO_x$ cylinders. The film pitch was calculated by dividing the length of the drawn line by (n−1), wherein n is the number of $SiO_x$ cylinders crossed by the drawn line.

EXAMPLE 1

Preparation of Hydroxyl-Terminated Polystyrene Brush

Into a 2 liter glass reactor under a nitrogen atmosphere was added cyclohexane (1,500 g). Styrene (50.34 g) was then added to the reactor via cannula. The contents of the reactor were then heated to 40° C. Sec-butyllithium (19.18 g) diluted in cyclohexane to a concentration of 0.32 M was then rapidly added to the reactor via cannula, causing the reactor contents to turn yellow. The contents of the reactor were stirred for 30 minutes. The contents of the reactor were then cooled to 30° C. Ethylene oxide (0.73 g) was then transferred into the reactor. The contents of the reactor were stirred for 15 minutes. Then a 20 mL of a 1.4 M solution of HCl in methanol was added to the reactor. The polymer in the reactor was then isolated by precipitating into isopropanol at a ratio of 500 mL of polymer solution to 1,250 mL of isopropanol. The resulting precipitate was then filtered and dried overnight in a vacuum oven at 60° C., yielding 42 g of product hydroxyl-terminated polystyrene. The product hydroxyl-terminated polystyrene exhibited a number average molecular weight, $M_N$, of 7.4 kg/mol and a polydispersity, PD, of 1.07.

EXAMPLE 2

Preparation PMMA-b-PTMSMMA Diblock Copolymer

Into a 500 mL 3-neck round bottom reactor under an argon atmosphere was added tetrahydrofuran ("THF") (226 g). The THF was then cooled in the reactor to −78° C. The contents of the reactor were then titrated with a 0.36 M solution of sec-butyllithium in cyclohexane until the contents of the reactor exhibited a persistent pale yellow color. The contents of the reactor were then warmed to, and maintained at, 30° C. until the color of the contents completely disappeared (approximately 10-15 minutes). 1,1-diphenylethylene (0.110 g) diluted in cyclohexane (14.308 g) was then transferred to the reactor via cannula. The contents of the reactor were then cooled to −78° C. Sec-butyllithium (0.62 g) diluted with cyclohexane to concentration of 0.60 M was then rapidly added to the reactor via cannula, causing the reactor contents to turn a dark ruby red. The reactor contents were allowed to stir for 15 minutes. Then methyl methacrylate (11.8 g) in cyclohexane (8.22 g) was transferred to the reactor via cannula, causing the color of the reactor contents to disappear. The reactor contents exhibited a 15° C. temperature rise within 1 minute of the addition of the methyl methacrylate to the reactor. The contents of the reactor then cooled back down to −78° C. and the reactor contents were stirred for an additional 55 minutes. A small portion of the reactor contents was then withdrawn for gel permeation chromatography analysis of the polymethyl methacrylate ("PMMA") block formed. (Trimethylsilyl)methyl methacrylate ("TMSMMA") (4.54 g) diluted in cyclohexane (6.94 g) was then transferred into the reactor via cannula. Within 2 minutes of the addition of the TMSMMA to the reactor, the reactor contents warmed to −74° C. before cooling back down to −78° C. The reactor contents were stirred for an additional 2.5 hours, after which the reaction was quenched by the addition of anhydrous methanol to the reactor. The reactor contents were then precipitated into 1 liter of methanol. The product solids were collected by vacuum filtration. After washing with additional methanol, the polymer was redissolved in 150 mL of methylene chloride, washed twice with deionized water and then reprecipitated into 1 liter of methanol. The polymer was then filtered and dried overnight in a vacuum oven at 60° C., yielding 14.7 g. The product poly(methyl methacrylate)-b-poly(trimethylsilyl)methyl methacrylate block copolymer ("BCP1") exhibited a weight average molecular weight, $M_w$, of 41.5 kg/mol; a polydispersity, PD, of 1.19 and a 29.7 wt % poly(trimethylsilyl)methyl methacrylate content (as determined by $^1$H NMR).

EXAMPLE 3

Preparation PMMA-b-PTMSMMA Diblock Copolymer

Into a 500 mL 3-neck round bottom reactor under an argon atmosphere was added tetrahydrofuran ("THF") (198 g). The THF was then cooled in the reactor to −78° C. The contents of the reactor were then titrated with a 0.36 M solution of sec-butyllithium in cyclohexane until the contents of the reactor exhibited a persistent pale yellow color. The contents of the reactor were then warmed to, and maintained at, 30° C. until the color of the contents completely disappeared (approximately 10-15 minutes). 1,1-diphenylethylene (0.135 g) diluted in cyclohexane (5.099 g) was then transferred to the reactor via cannula. The contents of the reactor were then cooled to −78° C. Sec-butyllithium (0.92 g) diluted with cyclohexane to concentration of 0.60 M was then rapidly added to the reactor via cannula, causing the reactor contents to turn a dark ruby red. The reactor contents were allowed to stir for 10 minutes. Then methyl methacrylate (11.85 g) in cyclohexane (11.99 g) was transferred to the reactor via cannula, causing the color of the reactor contents to disappear. The reactor contents exhibited a 17° C. temperature rise within 1 minute of the addition of the methyl methacrylate to the reactor. The contents of the reactor then cooled back down to −78° C. and the reactor contents were stirred for an additional 60 minutes. A small portion of the reactor contents was then withdrawn for gel permeation chromatography analysis of the polymethyl methacrylate ("PMMA") block formed. (Trimethylsilyl)methyl methacrylate ("TMSMMA") (4.53 g) diluted in cyclohexane (8.41 g) was then transferred into the reactor via cannula. Within 2 minutes of the addition of the TMSMMA to the reactor, the reactor contents warmed to −71° C. before cooling back down to −78° C. The reactor contents were stirred for an additional 2.1 hours, after which the reaction was quenched by the addition of anhydrous methanol to the reactor. The reactor contents were then precipitated into 1 liter of methanol. The product solids were collected by vacuum filtration. After washing with additional methanol, the polymer was redissolved in 150 mL of methylene chloride, washed twice with deionized water and then reprecipitated into 1 liter of methanol. The polymer was then filtered and dried overnight in a vacuum oven at 60° C., yielding 14.4 g. The product poly(methyl methacrylate)-b-poly(trimethylsilyl)methyl methacrylate block copolymer ("BCP2") exhibited a weight average molecular weight, $M_w$, of 32.6 kg/mol; a polydispersity, PD, of 1.22 and a 29.2 wt % poly(trimethylsilyl)methyl methacrylate content (as determined by $^1$H NMR).

EXAMPLE 4

PMMA-b-PTMSMMA Diblock Copolymer Filtering

Each of the PMMA-b-PTMSMMA diblock copolymers prepared according to Example 2-3 was added to toluene to form a 2.0 wt % solution. The 2.0 wt % solutions formed were then separately hand filtered through a 0.2 μm Whatman syringe filter. The product filtrate material was collected for subsequent use.

EXAMPLE 5

Preparation of Block Copolymer Composition

The product filtrate of Example 4 obtained from the PMMA-b-PTMSMMA diblock copolymer of Example 2, BCP1, and the product filtrate of Example 4 obtained from the PMMA-b-PTMSMMA diblock copolymer of Example 3, BCP2, were combined to form a BCP1:BCP2 weight ratio of 1:1. A poly(methyl methacrylate) homopolymer (H-PMMA) having a number average molecular weight of 15 kg/mol (from Scientific Polymer Products, Inc., catalog #424) was then added to the diblock copolymer blend to faun the product block copolymer composition having an H-PMMA:diblock copolymer blend weight ratio of 1:9. The product block copolymer composition was provided as 2 wt % solids in toluene; wherein the solids were blend of 10 wt % H-PMMA; 45 wt % BCP1 and 45 wt % BCP2.

EXAMPLE 6

Preparation of Block Copolymer Composition

The product filtrate of Example 4 obtained from the PMMA-b-PTMSMMA diblock copolymer of Example 2, BCP1, and the product filtrate of Example 4 obtained from the PMMA-b-PTMSMMA diblock copolymer of Example 3, BCP2, were combined to form a BCP1:BCP2 weight ratio of 1:1. A poly(methyl methacrylate) homopolymer (H-PMMA) having a number average molecular weight of 15 kg/mol (from Scientific Polymer Products, Inc., catalog #424) was then added to the diblock copolymer blend to form the product block copolymer composition having an H-PMMA: diblock copolymer blend weight ratio of 1:4. The product block copolymer composition was provided as 2 wt % solids in toluene; wherein the solids were blend of 20 wt % H-PMMA; 40 wt % BCP1 and 40 wt % BCP2.

EXAMPLE 7

Substrate Preparation

Substrates were prepared by cutting pieces (~1"×1") from a silicon wafer having a native oxide layer. A hydroxyl-terminated polystyrene brush prepared according to Example 1 was dissolved in toluene to form 1.5 wt % brush solution. The brush solution was then spin coated onto each substrate at 3,000 rpm for 1 minute. The deposited brush layer was then baked by placing the substrate onto a hotplate set at 150° C. for 1 minute. The deposited brush layer was then annealed by placing the substrate onto another hotplate set at 250° C. for 20 minutes in a nitrogen atmosphere. The substrate was then cooled to room temperature. The substrate was then immersed in toluene for 1 minute. The substrate was then spun dry at 3,000 rpm for 1 minute. The substrate was then placed on a hotplate set at 110° C. for 1 minute and then stored in nitrogen until used.

EXAMPLE 8

Film Deposition

A block copolymer composition prepared according to Example 5 was then spin coated onto the polystyrene brushed surface of a substrate prepared according to Example 7 to form a 59 nm film. The substrate was then placed on a hotplate set at 150° C. for 1 minute to bake the film. The substrate was then placed on another hotplate set at 270° C. under 25 psig nitrogen atmosphere for 1 hour.

A surface wetting layer of PTMSMMA formed on the annealed film at the atmosphere-film interface. The annealed films were then treated using two consecutive reactive ion etching (RIE) steps to reveal the block copolymer morphology of the deposited PMMA-b-PTMSMMA film. First, a short $CF_4$ plasma (10 mT, 50 W) RIE treatment (8 seconds post plasma stabilization) was used to punch through the surface wetting layer of PTMSMMA. Then, an $O_2$ plasma RIE treatment (25 seconds post plasma stabilization) was employed to remove the poly(methyl methacrylate) and converting the PTMSMMA to $SiO_x$.

The plasma treated product film was then examined by Scanning Electron Microscopy using a Hitachi S-4500 scanning electron microscope (SEM) with a secondary electron detector. The test sample was mounted on the SEM stage using double sided carbon tape and cleaned by blowing nitrogen prior to analysis. An image of the test sample was collected at 50,000× magnification and working distances between 4 and 8. A top down image of the product film is provided in FIG. 1.

EXAMPLE 9

Film Deposition

A block copolymer composition prepared according to Example 6 was then spin coated onto the polystyrene brushed surface of a substrate prepared according to Example 7 to form a 57.5 nm film. The substrate was then placed on a hotplate set at 150° C. for 1 minute to bake the film. The substrate was then placed on another hotplate set at 270° C. under 25 psig nitrogen atmosphere for 1 hour.

A surface wetting layer of PTMSMMA formed on the annealed film at the atmosphere-film interface. The annealed films were then treated using two consecutive reactive ion etching (RIE) steps to reveal the block copolymer morphology of the deposited PMMA-b-PTMSMMA film. First, a short $CF_4$ plasma (10 mT, 50 W) RIE treatment (8 seconds post plasma stabilization) was used to punch through the surface wetting layer of PTMSMMA. Then, an $O_2$ plasma RIE treatment (25 seconds post plasma stabilization) was employed to remove the poly(methyl methacrylate) and converting the PTMSMMA to $SiO_x$.

Figure 2:
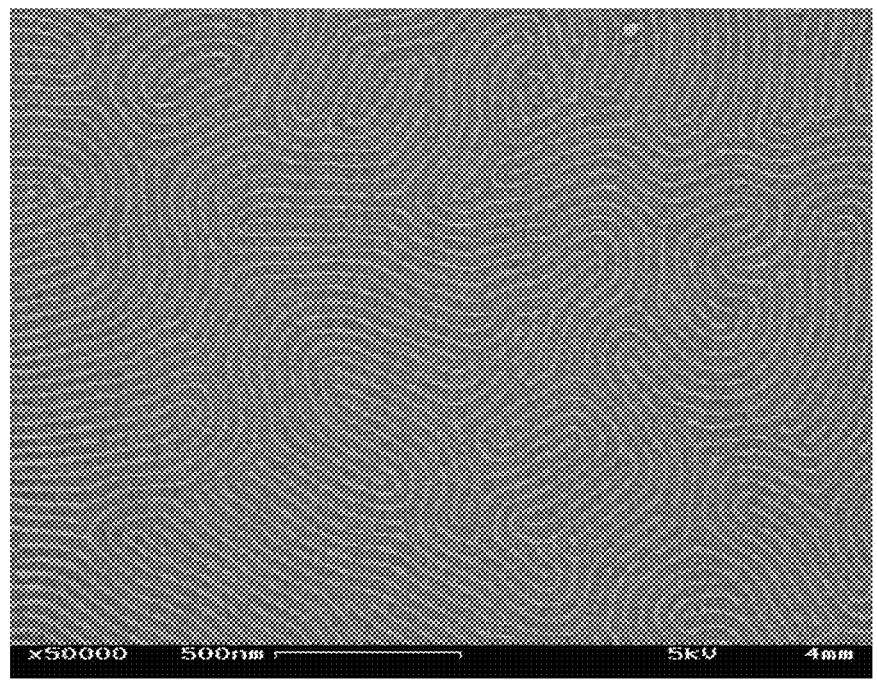
FIG. 2 is a depiction of a top down scanning electron microscopic ("SEM") image of the product film prepared according to Example 9.

The plasma treated product film was then examined by Scanning Electron Microscopy using a Hitachi S-4500 scanning electron microscope (SEM) with a secondary electron detector. The test sample was mounted on the SEM stage using double sided carbon tape and cleaned by blowing nitrogen prior to analysis. An image of the test sample was collected at 50,000× magnification and working distances between 4 and 8. A top down image of the product film is provided in FIG. 2.

We claim:
1. A block copolymer composition, comprising:
a diblock copolymer blend, comprising:
a first poly(methyl methacrylate)-b-poly((trimethylsilyl) methyl methacrylate) diblock copolymer ("DB1") having a DB1 number average molecular weight, $M_{N\text{-}DB1}$, of 10 to 1,000 kg/mol; a DB1 polydispersity, $PD_{DB1}$, of 1 to 3; and,
a second poly(methyl methacrylate)-b-poly((trimethylsilyl)methyl methacrylate) diblock copolymer ("DB2") having a DB2 number average molecular weight, $M_{N\text{-}DB2}$, of 1 to 1,000 kg/mol; a DB2 polydispersity, $PD_{DB2}$, of 1 to 3.

2. The block copolymer composition of claim 1, wherein the weight ratio of DB1 to DB2 in the diblock copolymer blend is 1:1 to 1:9.

3. The block copolymer composition of claim 1,
wherein the diblock copolymer blend exhibits a blend poly (methyl methacrylate) weight fraction, $Wf_{PMMA\text{-}Blend}$, in a range selected from the group of ranges consisting of 0.69 to 0.83; 0.39 to <0.69; and 0.23 to <0.39; and,
wherein the diblock copolymer blend exhibits a blend number average molecular weight, $M_{N\text{-}Blend}$, of 10 to 1,000 kg/mol.

4. The block copolymer composition of claim 1, wherein the diblock copolymer blend is ≥33 wt % to 99 wt % DB1 and 1 to ≤50 wt % DB2.

5. The block copolymer composition of claim 1, further comprising a solvent;
wherein the solvent is selected from the group consisting of propylene glycol monomethyl ether acetate (PGMEA), ethoxyethyl propionate, anisole, ethyl lactate, 2-heptanone, cyclohexanone, amyl acetate, γ-butyrolactone (GBL), n-methylpyrrolidone (NMP) and toluene.

6. The block copolymer composition of claim 1, further comprising an additive; wherein the additive is selected from the group consisting of additional polymers; surfactants; antioxidants; photoacid generators; thermal acid generators; quenchers; hardeners; adhesion promoters; dissolution rate modifiers; photocuring agents; photosensitizers; acid amplifiers; plasticizers; orientation control agents and cross linking agents.

7. The block copolymer composition of claim 1, further comprising a poly(methyl methacrylate) homopolymer.

8. The block copolymer composition of claim 7, wherein the weight ratio of the poly(methyl methacrylate) homopolymer ("HPMMA") to the diblock copolymer blend is 1:19 to 3:7.

9. The block copolymer composition of claim 8, wherein the weight ratio of the HPMMA to the diblock copolymer blend is 1:9 to 1:4; wherein the weight ratio of DB1 to DB2 is 1:1 to 1:2.5; wherein the weight fraction of poly(methyl methacrylate) in DB1, $Wf_{PMMA\text{-}DB1}$, is 0.7 to 0.75; wherein $M_{N\text{-}DB1}$ is 20 to 60 kg/mol; wherein $PD_{DB1}$ is 1 to 1.2; wherein the weight fraction of poly(methyl methacrylate) in DB2, $Wf_{PMMA\text{-}DB2}$, is 0.7 to 0.75; wherein $M_{N\text{-}DB2}$ is 20 to 60 kg/mol; and, wherein $PD_{DB2}$ is 1 to 1.2.

10. A method comprising:

providing a substrate;

providing a block copolymer composition according to claim 1;

applying a film of the block copolymer composition to the substrate;

optionally, baking the film;

annealing the film;

treating the annealed film to remove the poly(methyl methacrylate) from the annealed film and to convert the (trimethylsilyl)methyl methacrylate in the annealed film to an etch resistant species.

* * * * *